(No Model.) 7 Sheets—Sheet 1.

T. HILL.
DEVICE FOR CUTTING PLUG TOBACCO.

No. 471,859. Patented Mar. 29, 1892.

(No Model.)  7 Sheets—Sheet 2.

T. HILL.
DEVICE FOR CUTTING PLUG TOBACCO.

No. 471,859. Patented Mar. 29, 1892.

Witnesses:
Jas. E. Hutchinson
Henry C. Hazard

Inventor:
Thomas Hill by
Crindle and Russell his Attys (No Model.) 7 Sheets—Sheet 3.
T. HILL.
DEVICE FOR CUTTING PLUG TOBACCO.

No. 471,859. Patented Mar. 29, 1892.

(No Model.) 7 Sheets—Sheet 5.
T. HILL.
DEVICE FOR CUTTING PLUG TOBACCO.

No. 471,859. Patented Mar. 29, 1892.

(No Model.) 7 Sheets—Sheet 6.

T. HILL.
DEVICE FOR CUTTING PLUG TOBACCO.

No. 471,859. Patented Mar. 29, 1892.

(No Model.) 7 Sheets—Sheet 7.
T. HILL.
DEVICE FOR CUTTING PLUG TOBACCO.

No. 471,859. Patented Mar. 29, 1892.

Witnesses:
Jas. E. Hutchinson.
Henry C. Hazard.

Inventor
Thomas Hill by
Prindle and Russell his Attys.

UNITED STATES PATENT OFFICE.

THOMAS HILL, OF QUINCY, ILLINOIS, ASSIGNOR TO THE ADAMS TOBACCO PRESS COMPANY, OF SAME PLACE.

DEVICE FOR CUTTING PLUG-TOBACCO.

SPECIFICATION forming part of Letters Patent No. 471,859, dated March 29, 1892.

Application filed October 16, 1890. Serial No. 368,259. (No model.)

*To all whom it may concern:*

Figure 1:
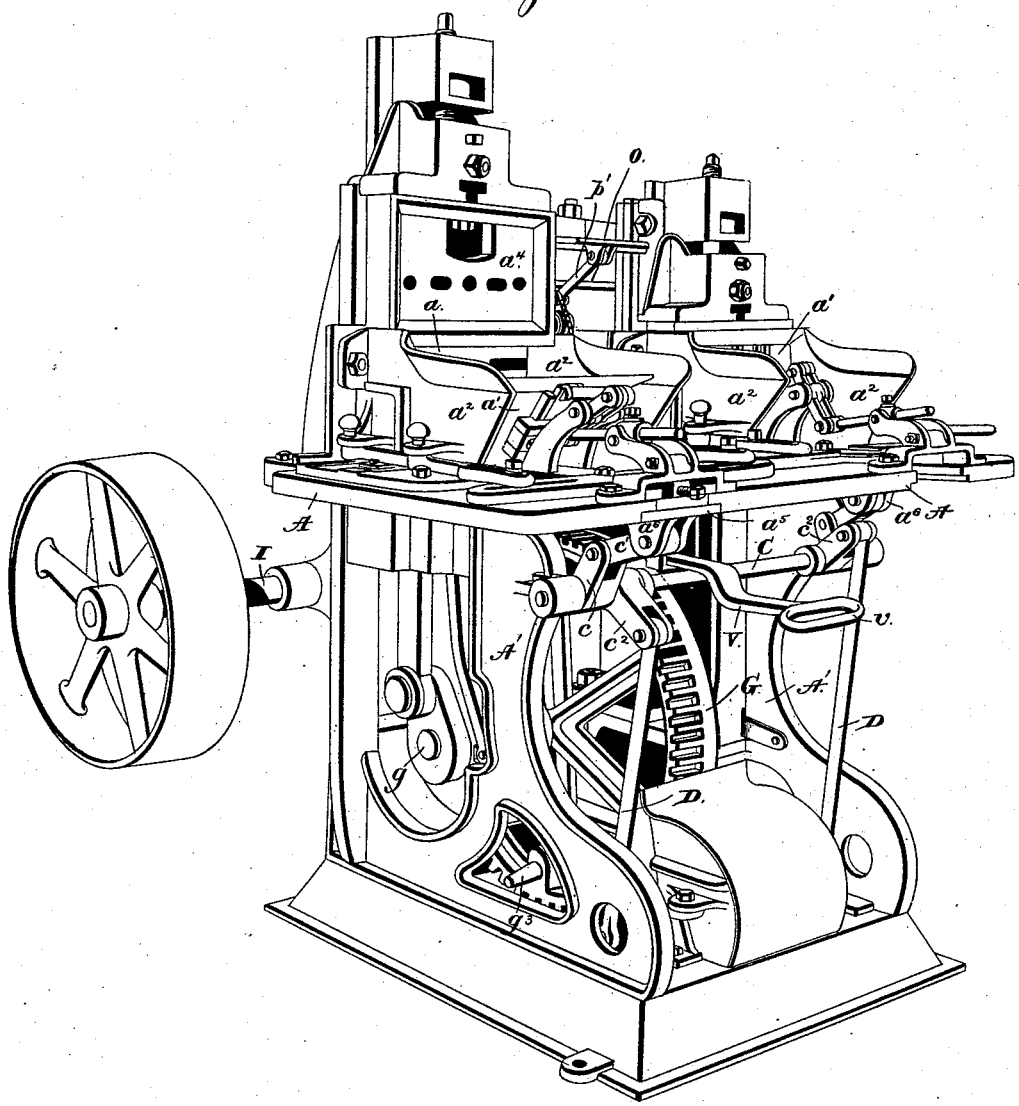
Figure 2:
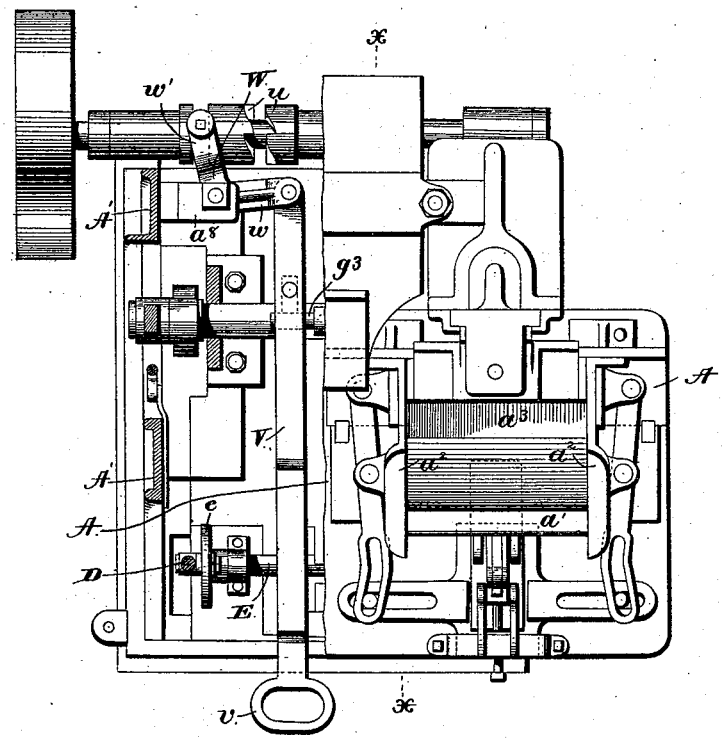
Figure 3:
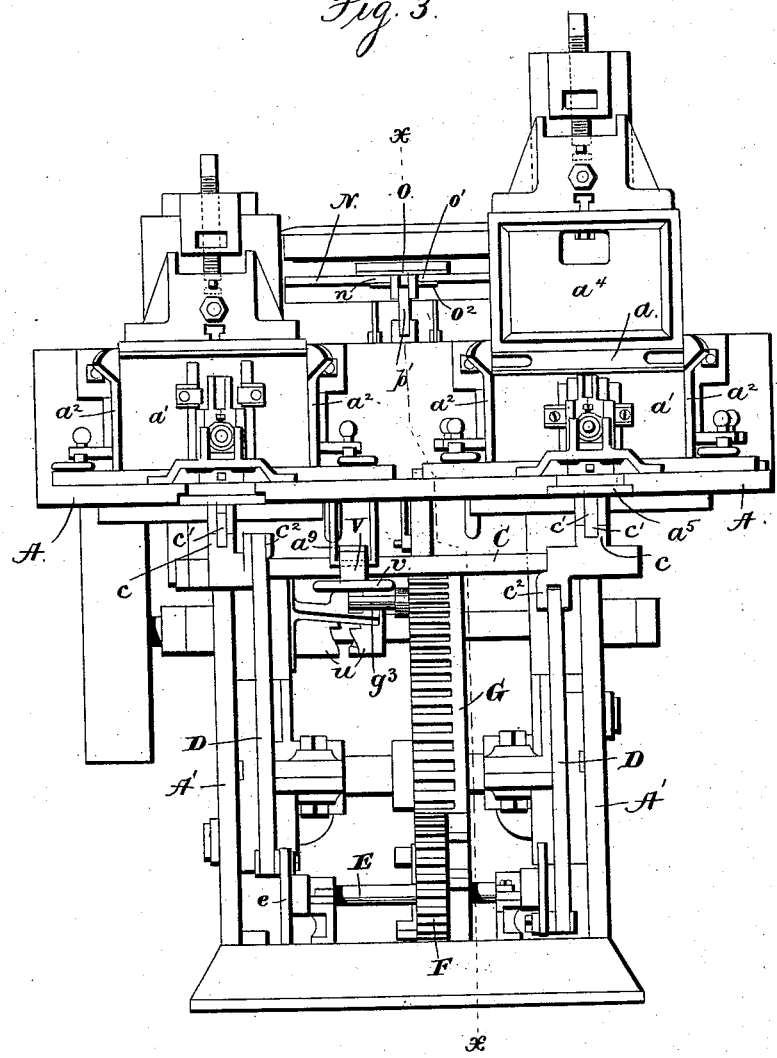
Figure 4:
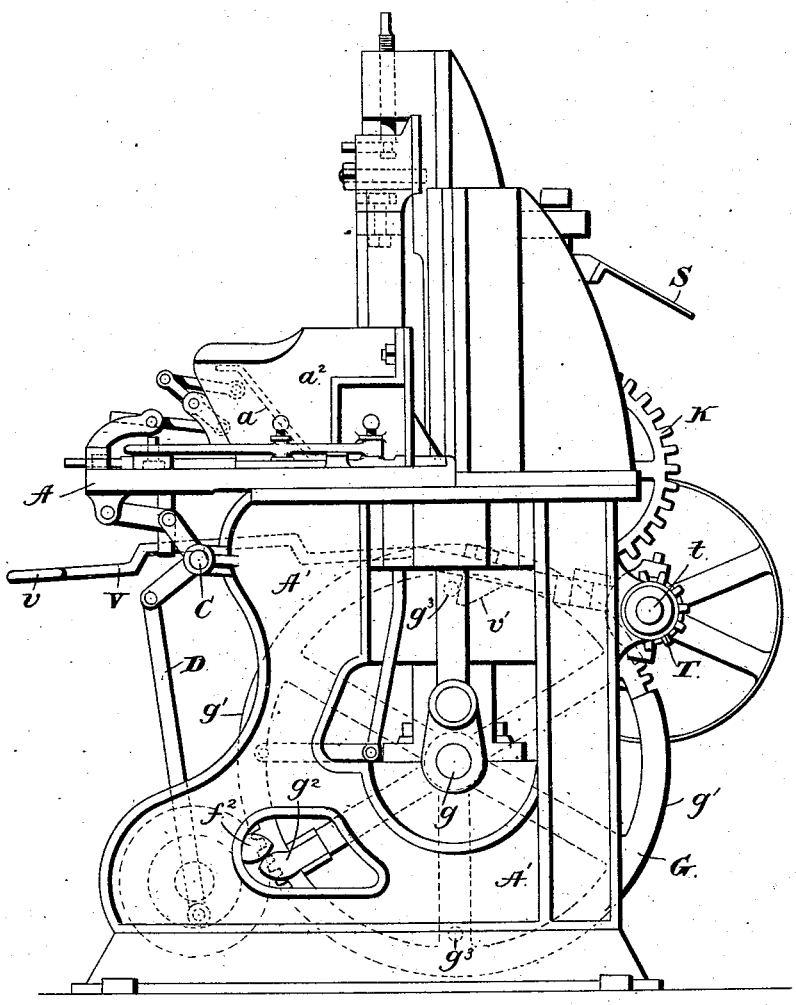
Figure 5:
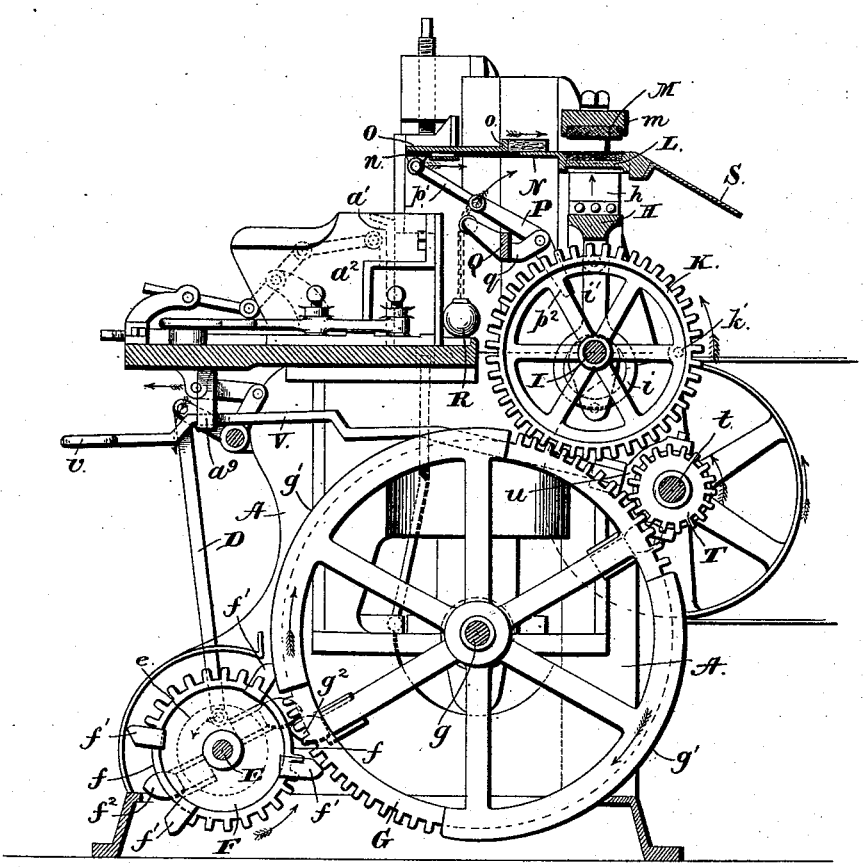
Figure 6:
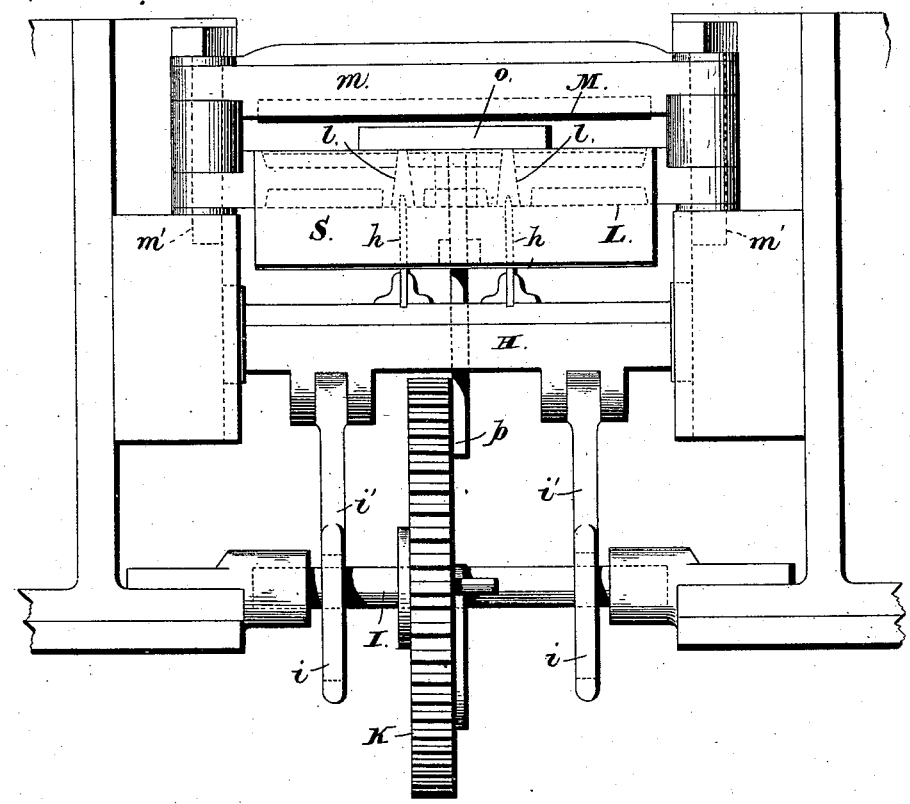
Figure 7:
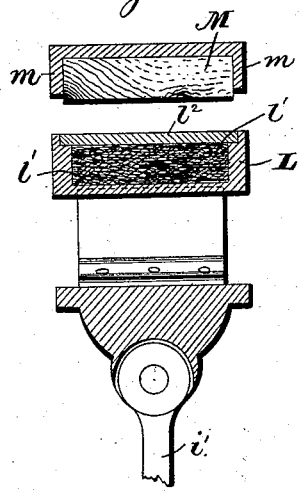
Figure 8:
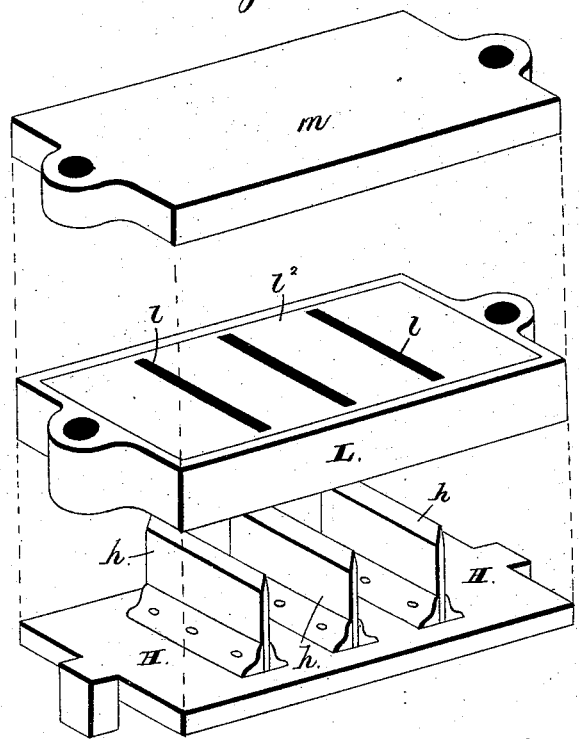

Be it known that I, THOMAS HILL, of Quincy, in the county of Adams, and in the State of Illinois, have invented certain new and useful Improvements in Devices for Cutting Plug-Tobacco; and I do hereby declare that the following is a full, clear, and exact description thereof, reference being had to the accompanying drawings, in which—
Figure 1 is a perspective view of a press containing my improvements. Fig. 2 is a view of the same from the upper side, partly in plan and partly in section. Fig. 3 is a front elevation of said press. Fig. 4 is an elevation of the same from the right-hand side. Fig. 5 is a vertical section upon the line $x\ x$ of Figs. 2 and 3. Fig. 6 is an enlarged rear elevation of the plug-cutting apparatus. Fig. 7 is a transverse vertical section thereof; and Fig. 8 is a perspective view of the cutting-knives, the guide for the latter, and the cutting-block separated from each other.

Letters of like name and kind refer to like parts throughout the several figures.
The design of my invention is to make certain improvements in devices for cutting plugs of tobacco into several pieces; and to this end said invention consists in the cutting device and the parts thereof constructed and arranged substantially as and for the purpose hereinafter specified.

In devising my cutting apparatus I have had particularly in view the production of such a device as will be specially adapted for use in connection with tobacco-presses and one that can be conveniently mounted upon the press and capable of being operated from some one of its moving parts, because the demand at present is for a press equipped with a cutter to cut the plug on its removal from the mold into sizes most convenient for vending, and the foregoing are some of the more important considerations involved in furnishing the most desirable appliance. Accordingly, in view of my special purpose, I show in the drawings and shall describe a press in conjunction with which my device is adapted to be used, premising, however, that I regard myself by no means to be confined to its employment only with such a press. The press I prefer to use is such a one as is shown and described in Patent No. 324,631, issued August 18, 1885, to C. B. Adams. Said press has two alternately-acting plug-molds, each of which consists of a stationary back wall $a$, a movable plate $a'$, constituting the front wall, movable side walls $a^2$ and $a^2$, stationary bottom $a^3$, and a vertically-reciprocating plunger $a^4$, all of said parts being constructed and operating substantially as the similar parts as shown in the patent above referred to.

Connected to the under side of the reciprocating part $a^5$ of each front and side wall moving mechanism is a rock-shaft C, the connecting means being a crank-arm $c$ thereon and a link $c'$, extending from the latter to lugs $a^6$ on said part $a^5$. Said rock-shaft extends horizontally across the front of the machine a short distance below the supporting plate or table A, being supported in such position in suitable bearings on the side pieces A' A' of the frame. To a second crank-arm $c^2$ on said shaft is pivotally attached the upper end of a pitman D, whose lower end is pivotally secured eccentrically to the face of a disk $e$, mounted on a shaft E, arranged transversely near the base of the machine parallel to the rock-shaft above. At or near its longitudinal center said shaft E has keyed to it a toothed wheel F, which is adapted to mesh with and be driven by a gear-wheel G, having a diameter approximately four times that of said wheel F and mounted on a transverse shaft $g$.

The mechanism just above set forth operates to reciprocate each of the front walls or plates into position while the tobacco is being operated upon and to retract the same, and also to operate the side walls, and as it is necessary that said movement of the front walls backward and forward shall not be continuous, but intermittent, the gearing composed of the wheels F and G is constructed so as to accomplish this end. The precise form of this gearing, however, is immaterial to the present specification, not being claimed herein, and hence no particular description thereof will be given. Said gearing and the mechanism connecting it with the parts of the molds to be moved are made the subject-matter of an application filed by me January 26, 1892, and having Serial No. 419,279.

The most convenient place on the press shown to place my cutting mechanism is upon the upper side of the press table or plate A between the two molds, and said mechanism is constructed as follows, viz:

Vertically movable in suitable ways $a^7$ and $a^7$, provided on the press-frame, is a block H, on whose upper side is arranged the desired number of knives $h$, (in this instance two,) which preferably consist of vertical blades $h'$, at whose lower ends are flanges, by means of which they can be attached to said block. Vertical movement of the latter is effected by means of two eccentrics $i$ and $i$, connected to the under side thereof near each end by means of eccentric straps and rods or pitmen $i'$ and $i'$. Said eccentrics are mounted on and rotate with a shaft I, which is journaled in suitable bearings on the supporting-frame of the press and is given its rotation through the medium of a gear-wheel K, keyed thereto, that meshes with the gear-wheel G, so as to be driven thereby.

A hollow metal box L, supported just above the knife-carrying block or head H, serves as a support for the plug when in position to be cut and as a guide for the knives, being furnished for the latter purpose with slots $l$, through which the same may pass. The interior of said box is filled with felt, sponge, or other absorbent material $l'$, saturated with some flavoring substance, which, as the absorbent material is arranged so that it rests against the sides of the knives, lubricates them, so as to enable them to pass readily through the tobacco to cut it. The top $l^2$ of the box L is preferably made removable to permit access to its interior.

Arranged above the knife-guide and lubricant-holder L, with its lower face approximately at the upper limit of the movement of said knives, is a cutting-block, against which the plug of tobacco is held during upward passage of the knives. Said block may consist, as shown, of a piece of wood M or analogous material, secured in a supporting-frame $m$, which preferably is provided with eyes or openings at its opposite ends for the passage of bolts $m'$ for holding it in place. The same bolts $m'$ also hold the guide device L in proper position, which latter is likewise provided with eyes or openings at its ends for the passage thereof.

To receive a plug of tobacco when it is to be fed into position to be cut, a plate or table N is arranged in front of the knives, on which a plug may be placed for engagement by the upturned end $o$ of a reciprocable feed-plate O. A plug when so engaged by the latter is carried into position over the knives and under the cutting-block.

The feed-plate is reciprocated by means of a lever P, pivoted beneath the same on an arm $q$, projecting from a bar or plate Q on the press-frame, to which lever said plate is connected by a link $p'$. From the point where it is thus pivoted said lever has a downwardly and rearwardly extending piece or tail $p^2$ arranged adjacent to the gear-wheel K, so as to be in position to be engaged by a pin or stud $k'$ on the wheel near the periphery thereof. When so engaged, the lever P will be operated and through it the feed-plate moved the distance necessary to place the plug into position to be cut. Said feed-plate is moved in the opposite direction by means of a weight R, attached to the lever P by a chain secured thereto at the point where said lever is attached to the link $p$, which connects it to the feed-plate. If desired, a spring may be employed instead of a weight.

The feed-plate O is situated upon the upper side of the plate or table N and is guided in its movements thereon by means of a longitudinal slot or guideway $n$, formed in said table at or near its transverse center, with which way engages a guide lug or block $o'$, that projects downwardly therein from said feed-plate O. A thin bar or piece $o^2$, longer than the slot or way $n$ is wide, is attached to the under side of the lug $o'$, so as to have its ends overlap and engage with the edges of the feed-plate which bound the slot or way $n$. The object of the overlapping edges is to hold the feed-plate down against the upper side of the table N and prevent its rising upward therefrom; but, as the same end can be attained by providing the lug $o'$ with outwardly-extending pieces or projections formed integrally therewith on opposite sides at its lower end, the latter construction may be used instead of the plate or piece $o^2$. This mechanism is designed to operate and the movements of the parts are timed so that as soon as a plug has been cut and the knives have been withdrawn therefrom an uncut plug, previously placed on the table N, will be immediately fed forward, thereby forcing the pieces of the cut plug from between the knives and the cutting-block M out onto an inclined discharging table or plate S, down which said pieces can slide to some suitable receptacle.

Motion is given the gear-wheel G by means of a pinion T, mounted on a driving-shaft $t$, that extends across the machine at the rear side thereof, the frame of the latter being provided with suitable bearings for its support. Said pinion is loosely mounted on the shaft $t$ and is adapted to be connected with and disconnected from the same to operate the press and stop it by means of a clutch $u$, also on said shaft. Such clutch is operated through the medium of a longitudinally-movable bar V, placed just beneath the plate or table A of the press, with its rear end connected to one arm $w$ of a bell-crank lever W, whose other arm $w'$ is in engagement with the sliding member of said clutch. The bell-crank lever W is pivoted to an arm $a^8$, that projects inwardly from the side piece A' of the press-frame. The front end of the bar V, which for convenience in manipulation by the operator is at such point furnished with a handle $v$, is supported by a loop or bracket $a^9$, fixed to the under side of the table A.

By the use of my cutting device the necessity for the retailer to cut the plugs is obviated, as the cutting into vendible sizes can be done immediately after the removal of the plug from the mold. This, too, enables each piece in its vendible size to be separately wrapped before being boxed. The use of a number of knives fixedly held at certain distances apart insures perfect uniformity in the size of the several pieces.

Having thus described my invention, what I claim is—

1. In a device for cutting tobacco, in combination, a cutter, a lubricant-holding box that is slotted to enable said cutter to pass therethrough to have contact with the lubricant therein, and a suitable support for the tobacco to be cut, substantially as and for the purpose specified.

2. In a device for cutting tobacco, in combination, vertically-moving cutting-knives, a supporting-table for material to be cut, consisting of a lubricant-holding box having openings for the passage of said knives, and a cutting-block above said table, substantially as and for the purpose shown.

3. In a device for cutting tobacco, in combination, vertically-movable cutting-knives, a support for material to be cut, consisting of a lubricant-holding box having openings for the passage of the knives, a reciprocating feed-plate to convey such material to said support, and a cutting-block above the latter, substantially as and for the purpose set forth.

4. In a device for cutting plugs of tobacco, in combination with cutting-knives, a box slotted for the passage of the knives and the lubricant-saturated material held thereby, substantially as and for the purpose specified.

5. In a device for cutting tobacco, in combination, cutting-knives, a cutting-block, and the box between containing a lubricant-saturated body and having openings for passage of the knives, substantially as and for the purpose shown.

6. In a device for cutting tobacco, in combination, vertically-movable knives, a cutting-block, and the box between containing a lubricant-saturated body and having openings for passage of the knives, adapted for supporting the material to be cut, substantially as and for the purpose set forth.

7. In a cutting device, in combination, a vertically-movable knife or knives, a support for the object to be cut, adapted to hold a lubricant for the latter, a feed device, a vibratory lever to reciprocate the latter, a link between said device and said lever, a weight to move the parts in one direction, and suitable means to move them in the other, substantially as and for the purpose described.

8. In a device for cutting plugs of tobacco, in combination with vertically-movable cutting-knives, a box slotted for the passage of the latter, containing a lubricant, a reciprocable feed device, and an inclined discharging-plate, substantially as and for the purpose set forth.

In testimony that I claim the foregoing I have hereunto set my hand this 26th day of September, 1890.

THOMAS HILL.

Witnesses:
F. M. McCann,
Frederick Rupp.